(No Model.)  J. L. RITER.  2 Sheets—Sheet 1.
SEEDING MACHINE.
No. 301,523.  Patented July 8, 1884.
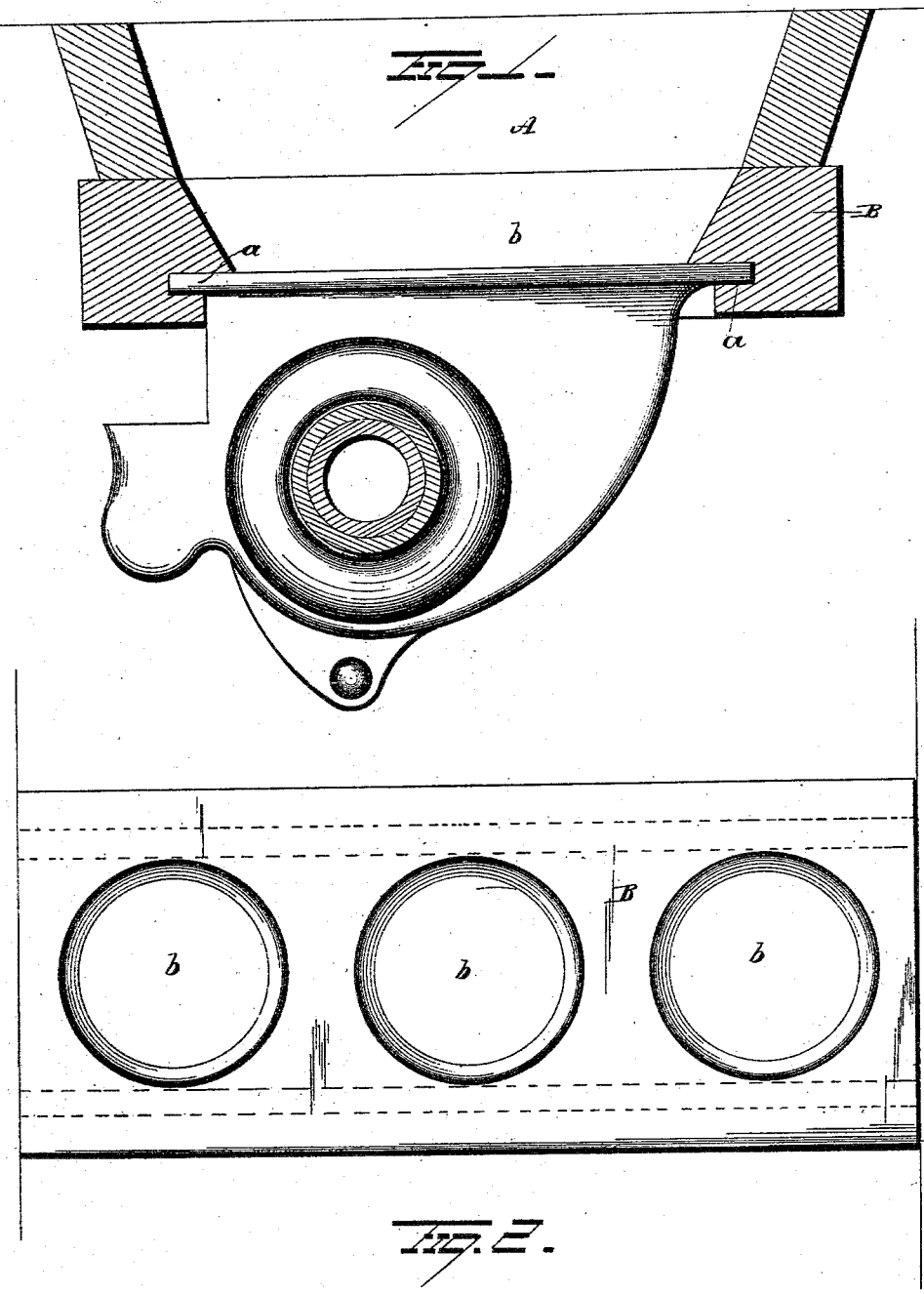
WITNESSES:
INVENTOR
J. L. Riter.
ATTORNEY

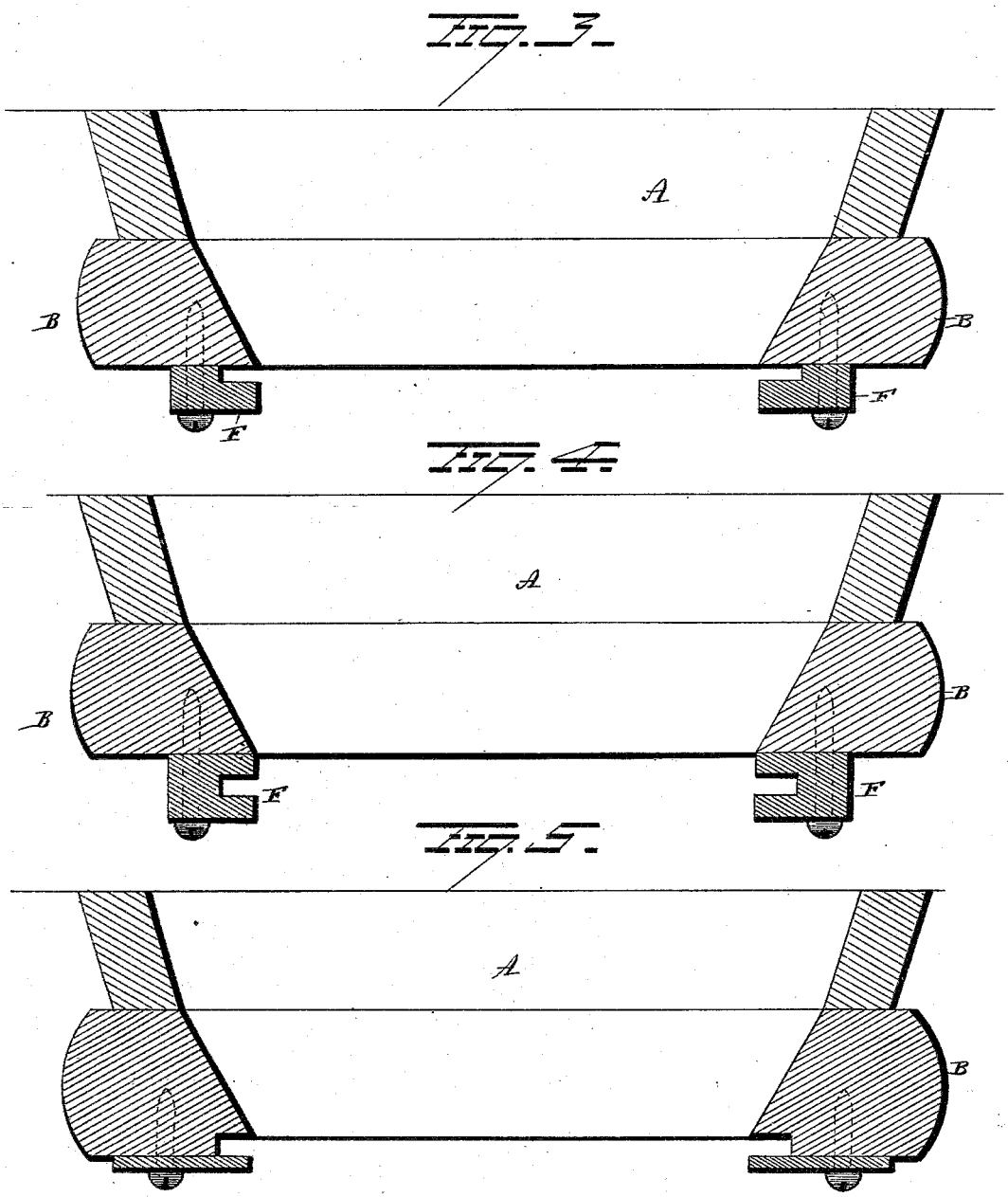

UNITED STATES PATENT OFFICE.

JOHN L. RITER, OF BROWNSVILLE, INDIANA.

SEEDING-MACHINE.

SPECIFICATION forming part of Letters Patent No. 301,523, dated July 8, 1884.

Application filed April 9, 1884. (No model.)

*To all whom it may concern:*

Be it known that I, JOHN L. RITER, of Brownsville, in the county of Union and State of Indiana, have invented certain new and useful Improvements in Seeding-Machines; and I do hereby declare the following to be a full, clear, and exact description of the invention, such as will enable others skilled in the art to which it appertains to make and use the same.

My invention relates to an improvement in seeding and fertilizing machines, the object of the same being to provide simple and efficient means whereby the seed or fertilizer cups or plates can be accurately and quickly secured to the hopper without the necessity of adjusting each cup or plate separately; and with these ends in view my invention consists in the parts and combinations of parts, as will be more fully explained, and pointed out in the claims.

In the accompanying drawings, Figure 1 is a transverse sectional view of a hopper embodying my invention. Fig. 2 is a plan view of the hopper. Figs. 3, 4, and 5 are modifications.

A represents a hopper of any size and shape, provided, preferably, with a wooden bottom, B, having a series of sloping discharge-openings, b, formed thereon, through which the seed or fertilizer passes. These openings are formed in a line, to enable a common shaft to operate all the droppers, and the bottom B is provided on its lower face with a longitudinal groove, which latter is preferably T shape in cross-section, as shown, to form rests for the flanges a, formed integral with the seed-cups. The groove, which can be formed at a single operation by a rotary cutter, which is also T shape in cross-section, intersects the discharge-openings, and forms seats for the entire series of cups. If desired, the groove can be commenced at one end and terminate just before it reaches the opposite end, thereby forming a wall or abutment, which latter prevents the cups from displacement in one direction, while a screw or nails driven into the bottom outside of the other end cup prevents displacement in the opposite direction. These cups are slipped into the groove one after the other, and are held in position under the respective discharge-openings by intermediate strips or blocks; or the cups can be provided with flanges or lugs to hold them a predetermined distance apart. By this method the cups are entered in a straight line, and hence there is no difficulty encountered in entering the shaft or adjusting the feed-cups thereon.

In some instances, more particularly when the improvement is to be applied to fertilizers, I can dispense with the grooved bottom and secure the feed-plates or feed-cups, as the case may be, in grooves formed in the front and rear sections of the hopper.

In Fig. 3 I have rabbeted strips F, secured to the bottom of the hopper, for holding the cups, while in Fig. 4 the strips are provided with grooves for the same purpose.

In Fig. 5 I have shown the front and rear sections of the bottomless hopper provided with rabbets in which the flanges of the plates or seed-cups rest. Strips of metal or wood are then secured to the said front and rear sections below the flanges of the cups or plates, and hold the latter in position.

I do not confine myself to T-shaped grooves, as they may be dovetail or any other shape and answer the same purpose.

By means of the single groove the entire series of cups can be placed in position in a few moments, and a considerable saving in the cost of manufacture is effected.

Having fully described my invention, what I claim as new, and desire to secure by Letters Patent, is—

1. In a seeding or fertilizing machine, the combination, with a seed-wheel shaft, of a series of seed cups or plates having side flanges, and a hopper having a continuous longitudinal groove or grooves for the reception of the opposite side flanges of the cups or plates.

2. The combination, with a hopper having a wooden bottom provided with discharge-openings formed therein and with a continuous longitudinal groove, of a series of seed-cups provided with side flanges, which latter rest within said grooves, substantially as and for the purpose set forth.

In testimony whereof I have signed this specification in the presence of two subscribing witnesses.

JOHN L. RITER.

Witnesses:
GEO. F. DOWNING,
GEORGE COOK.